US010540447B2

(12) United States Patent
Jagan et al.

(10) Patent No.: US 10,540,447 B2
(45) Date of Patent: Jan. 21, 2020

(54) METHOD AND DEVICE FOR N-GRAM IDENTIFICATION AND EXTRACTION

(71) Applicant: WIPRO LIMITED, Bangalore (IN)

(72) Inventors: Balaji Jagan, Bangalore (IN);
Meenakshi Sundaram Murugeshan, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/935,571

(22) Filed: Mar. 26, 2018

(65) Prior Publication Data

US 2019/0294670 A1 Sep. 26, 2019

(30) Foreign Application Priority Data

Mar. 20, 2018 (IN) .............................. 201841010111

(51) Int. Cl.
*G06F 17/27* (2006.01)

(52) U.S. Cl.
CPC ................................ *G06F 17/2785* (2013.01)

(58) Field of Classification Search
CPC .................................................. G06F 17/2785
See application file for complete search history.

(56) References Cited

U.S. PATENT DOCUMENTS

| 5,640,487 | A | 6/1997 | Lau et al. |
| 7,739,103 | B2 | 6/2010 | Deane |
| 8,023,974 | B1* | 9/2011 | Diao .................... G06K 9/6269 455/466 |
| 2015/0254555 | A1 | 9/2015 | Williams, Jr. et al. |
| 2016/0085742 | A1* | 3/2016 | Mahmud ............. G06F 17/2775 704/9 |
| 2017/0169014 | A1* | 6/2017 | Sotelo .................. G06F 17/289 |

FOREIGN PATENT DOCUMENTS

CN 103593427 A * 2/2014

OTHER PUBLICATIONS

Pecina, An Extensive Empirical Study of Collocation Extraction Methods, 2005, Proceedings of the ACL Student Research Workshop, pp. 13-18 (Year: 2015).*
Sarkar, A., "Bootstrapping a Classifier Using the Yarowsky Algorithm", *Simon Fraser University*, (2009), pp. 1-55.

* cited by examiner

*Primary Examiner* — Sonia L Gay
(74) *Attorney, Agent, or Firm* — Finnegan, Henderson, Farabow, Garrett & Dunner, LLP (57) ABSTRACT

A method and device for n-gram identification and extraction is disclosed. The method includes identifying at least one n-gram from a sentence inputted by a user based on a confidence score associated with each of the at least one n-gram. The method further includes determining a direction context entropy coefficient for each of the at least one n-gram. The method includes iteratively expanding one or more of the at least one n-gram by the smallest n-gram unit at each iteration in a predefined direction in the sentence to generate at least one expanded n-gram, based on an associated direction context entropy coefficient. The method further includes extracting at each expanding iteration one or more of the at least one expanded n-gram based on an associated confidence score. The method includes grouping semantically linked n-grams from the one or more of the at least one expanded n-gram.

18 Claims, 6 Drawing Sheets

METHOD AND DEVICE FOR N-GRAM IDENTIFICATION AND EXTRACTION

TECHNICAL FIELD

This disclosure relates generally to n-grams and more particularly to method and device for n-gram identification and extraction.

BACKGROUND

Identification and extraction of n-grams from text sequence is useful in identifying similar context and to extract different variations through semantics. It can also be used to generate variety of sentences where n-grams are preserved without losing the sequence and meaning. Identifying and extracting n-grams is very essential in many applications of natural language processing, word context disambiguation, and web searching. However, there are high chances of losing contextual information as well as sequence and meaning of the extracted text sequence, if the identification and extraction is not done correctly and in an efficient manner. Conventional systems additionally fail to tackle semantically similar and semantically related words in the n-gram sequence.

SUMMARY

In one embodiment, a method for n-gram identification and extraction is disclosed. The method includes identifying, by a computing device, at least one n-gram from a sentence inputted by a user based on a confidence score associated with each of the at least one n-gram, wherein a confidence score for an n-gram is computed based on comparison of the n-gram with existing word patterns. The method further includes determining, by the computing device, a direction context entropy coefficient for each of the at least one n-gram, based on the existing word patterns. The method includes iteratively expanding, by the computing device, one or more of the at least one n-gram by the smallest n-gram unit at each iteration in a predefined direction in the sentence to generate at least one expanded n-gram, based on an associated direction context entropy coefficient. The method further includes extracting at each expanding iteration, by the computing device, one or more of the at least one expanded n-gram based on a confidence score associated with each of the one or more of the at least one expanded n-gram, wherein a confidence score for an expanded n-gram is computed based on comparison of the expanded n-gram with the existing word patterns. The method includes grouping, by the computing device, semantically linked n-grams from the one or more of the at least one expanded n-gram.

In another embodiment, a computing device for n-gram identification and extraction is disclosed. The computing device includes a processor and a memory communicatively coupled to the processor, wherein the memory stores processor instructions, which, on execution, causes the processor to identify at least one n-gram from a sentence inputted by a user based on a confidence score associated with each of the at least one n-gram, wherein a confidence score for an n-gram is computed based on comparison of the n-gram with existing word patterns. The processor instructions further cause the processor to determine a direction context entropy coefficient for each of the at least one n-gram, based on the existing word patterns. The processor instructions cause the processor to iteratively expand one or more of the at least one n-gram by the smallest n-gram unit at each iteration in a predefined direction in the sentence to generate at least one expanded n-gram, based on an associated direction context entropy coefficient. The processor instructions further cause the processor to extract at each expanding iteration one or more of the at least one expanded n-gram based on a confidence score associated with each of the one or more of the at least one expanded n-gram, wherein a confidence score for an expanded n-gram is computed based on comparison of the expanded n-gram with the existing word patterns. The processor instructions cause the processor to group semantically linked n-grams from the one or more of the at least one expanded n-gram.

In yet another embodiment, a non-transitory computer-readable storage medium is disclosed. The non-transitory computer-readable storage medium has instructions stored thereon, a set of computer-executable instructions causing a computer comprising one or more processors to perform steps comprising identifying at least one n-gram from a sentence inputted by a user based on a confidence score associated with each of the at least one n-gram, wherein a confidence score for an n-gram is computed based on comparison of the n-gram with existing word patterns; determining a direction context entropy coefficient for each of the at least one n-gram, based on the existing word patterns; iteratively expanding one or more of the at least one n-gram by the smallest n-gram unit at each iteration in a predefined direction in the sentence to generate at least one expanded n-gram, based on an associated direction context entropy coefficient; extracting at each expanding iteration one or more of the at least one expanded n-gram based on a confidence score associated with each of the one or more of the at least one expanded n-gram, wherein a confidence score for an expanded n-gram is computed based on comparison of the expanded n-gram with the existing word patterns; and grouping semantically linked n-grams from the one or more of the at least one expanded n-gram.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
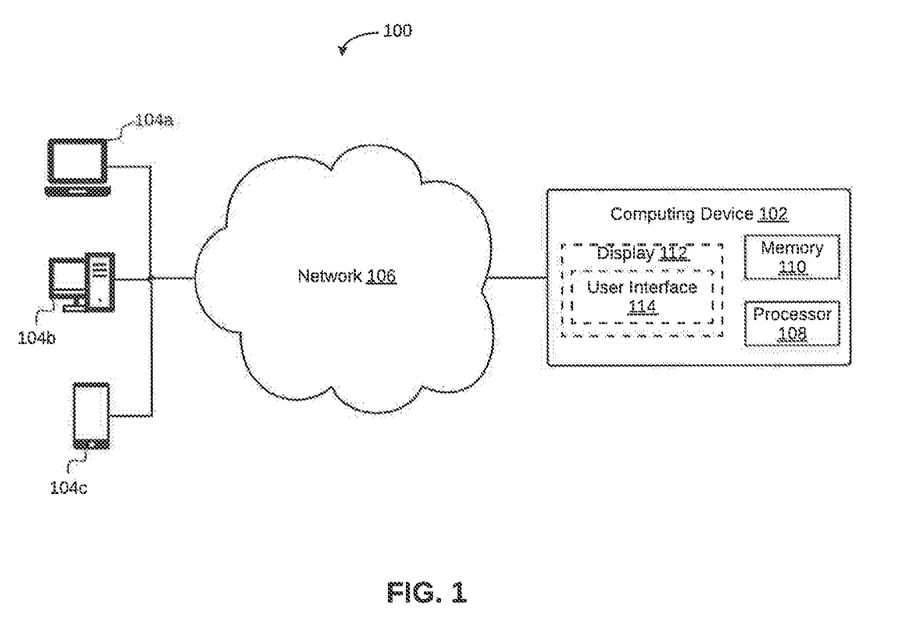
FIG. 1 is a block diagram illustrating a system for identifying and extracting n-grams from sentences, in accordance with an embodiment.

Additional illustrative embodiments are listed below. In one embodiment, a system 100 for identifying and extracting n-grams from sentences, is illustrated in FIG. 1. The sentences may be natural language sentences occurring within documents. Examples of these documents may include, but are not limited to PDF documents, images, or web-pages. Alternatively, the sentences may be natural language sentences inputted by a user either vocally (for example, on an Interactive Voice Response (IVR) menu) or by way of text (for example, on a chat window), A n-gram, may be a contiguous sequence of n items from a given sequence of text or speech. The items may be a sequence of syllables, alphabets, or words. However, in the current embodiment, n-gram is a contiguous sequence of "n" words. By way of an example, in the sentence: "I work with American Express in United States of America." Each individual word is a unigram. In other words, "n" has a value of 1 in this case. By way of an example, following are few unigrams in the sentence given above: "American," "United," "America," "Express," and "States." Similarly, two contiguous words in sequence will form a bigram. In other words, "n" has a value of 2 in this case. By way of an example, following are few bigrams in the sentence given above: "American Express," and "United States." Similarly, three contiguous words in a sequence will form a trigram. In other words, "n" has a value of 3 in this case. By way of an example, following are few trigrams in the sentence given above: "United States of." In a similar manner, an example of a tetra-gram in the sentence given above: "United States of American," which includes fours contiguous words in sequence.

System 100 includes a computing device 102 that identifies and extracts n-grams from sentences. Computing device 102, may be an application server. It will be apparent from the examples given above that n-grams extracted from a sentence help in ascertaining the context in which individual words have been used in a sentence. The sentences may be provided by a user through a plurality of computing devices 104 (for example, a laptop 104a, a desktop 104b, and a smart phone 104c). Other examples of plurality of computing devices 104, may include, but are not limited to a phablet and a tablet. Plurality of computing devices 104 are connected to computing device 102 via a network 106, which may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (CPRS).

When a user of laptop 104a, for example, provides a query in natural language via an application installed in laptop 104a, laptop 104a communicates with computing device 102, via network 106. Computing device 102 may convert the query into a natural language sentence (if inputted verbally by the user) and thereafter may identify and extract n-grams from the query. To this end, computing device 102 includes a processor 108 that is communicatively coupled to a memory 110, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

Memory 110 further includes various modules that enable computing device 102 to identify and extract n-grams from sentences. These modules are explained in detail in conjunction with FIG. 2. Computing device 102 may further include a display 112 having a User Interface (UI) 114 that may be used by a user or an administrator to provide various inputs to computing device 102. Display 112 may further be used to display result of analysis performed by computing device 102. The functionality of computing device 102 may alternatively be configured within each of plurality of computing devices 104.

Figure 2:
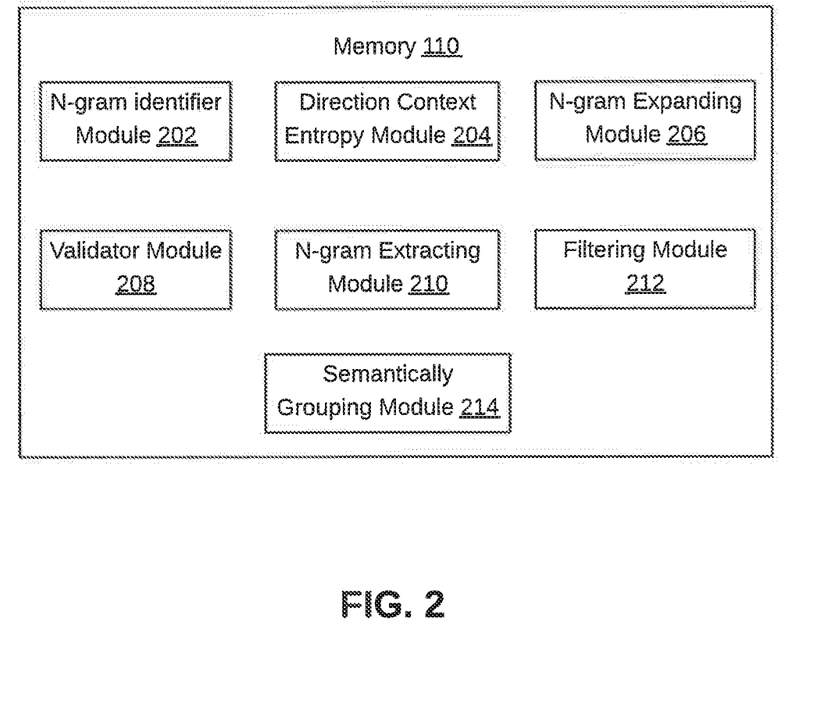
FIG. 2 is a block diagram illustrating various modules within a memory of a computing device configured to identify and extract n-grams from sentences, in accordance with an embodiment.

Referring now to FIG. 2, a block diagram illustrating various modules within memory 110 of computing device 102 configured to identify and extract n-grams, in accordance with an embodiment. Memory 110 includes an n-gram identifier module 202, a direction context entropy module 204, an n-gram expanding module 206, a validator module 208, an n-gram extracting module 210, a filtering module 212, and a semantically grouping module 214.

Once a sentence has been inputted by a user, n-gram identifier module 202 identifies one or more n-grams from the sentence. During initiation of the process, each of the one or more n-grams identified from the sentence may be unigrams. By way of an example, the sentence is: "I work with American Express in United States of America" The unigrams identified for this sentence include: "Work," "With," "I," "American," "United," "America," "Express," and "States." The one or more n-grams may be identified based on a confidence score associated with each of the one or more n-grams. A confidence score for an n-gram is computed based on comparison of the n-gram with existing word patterns. The existing word patterns may be stored in a data repository (not shown in FIG. 1) in communication with computing device 102 via network 106. The existing word patterns may be added in the data repository based on test data extracted from a word corpus that has an exhaustive list of word patterns. The data repository may be continuously updated based on identification of new word patterns. This is further explained in detail in conjunction with FIG. 3.

Thereafter, direction context entropy module 204 determines a direction context entropy coefficient for each of the one or more n-grams. The direction context entropy coefficient includes a left context entropy coefficient and a right context entropy coefficient. When the left context entropy coefficient for the n-gram is higher than an associated predefined context threshold, the n-gram is expanded in the left direction in the sentence. Alternatively, when the right context entropy coefficient for the n-gram is higher than an associated predefined context threshold, the n-gram is expanded in the right direction in the sentence. This is further explained in detail in conjunction with FIG. 3.

Based on the associated direction context entropy coefficient, n-gram expanding module 206, at each iteration, iteratively expands one or more n-grams by the smallest n-gram unit in a predefined direction (i.e., left direction or right direction) in the sentence to generate one or more expanded n-grams. The smallest n-gram unit is a unigram. In other words, an n-gram is expanded by a unigram at each iteration. Thus, if the left direction context entropy coefficient is greater than the associated predefined context threshold, the n-gram is expanded in the left direction in the sentence. This is further explained in detail in conjunction with FIG. 3.

In an embodiment, validator module 208 validates expansion of each of the one or more n-grams in the predefined direction. The validation for an n-gram is performed based on one or more of an associated cross context entropy coefficient and an associated reverse cross context entropy coefficient. These measures will give the confidence to expand each of the one or more n-grams, in order to decide whether to expand an n-gram or to stop expansion of the n-gram. This is further explained in detail in conjunction with FIGS. 4A and 4B.

After validation, at each expanding iteration, n-gram extraction module 210 extracts one or more expanded n-grams based on a confidence score associated with each of the one or more expanded n-gram. In other words, after an n-gram has been expanded to generate an expanded n-gram, first a confidence score is computed for the expanded n-gram, and based on the confidence score for the expanded n-gram, the expanded n-gram is extracted or ignored. In an embodiment, the expanded n-gram is extracted if confidence score associated with the expanded n-gram is greater than an associated threshold score. A confidence score for an expanded n-gram is computed based on comparison of the expanded n-gram with the existing word patterns. This is further explained in detail in conjunction with FIGS. 4A and 4B.

Filtering module 212 may then filter one or more of expanded n-grams extracted above, based on associated one or more context divergence coefficients. Each of one or more filtered n-grams have low relevancy confidence score, which is determined based on the associated one or more context divergence coefficients. The one or more context divergence coefficients include a left context divergence coefficient and a right context divergence coefficient. The one or more context divergence coefficients further include a skew divergence coefficient and a reverse skew divergence coefficient, that validate the result obtained from the left and right context divergence coefficients. This is further explained in detail in conjunction with FIGS. 4A and 4B.

After filtering of one or more expanded n-grams that have been extracted, semantically grouping module 214 then groups semantically linked n-grams from the one or more expanded n-grams extracted by n-gram extracting module 210. Thus, the semantically similar and semantically related instances or n-grams, which are not captured and/or ignored in previous stages are identified and extracted. This is further explained in detail in conjunction with FIG. 3.

Figure 3:
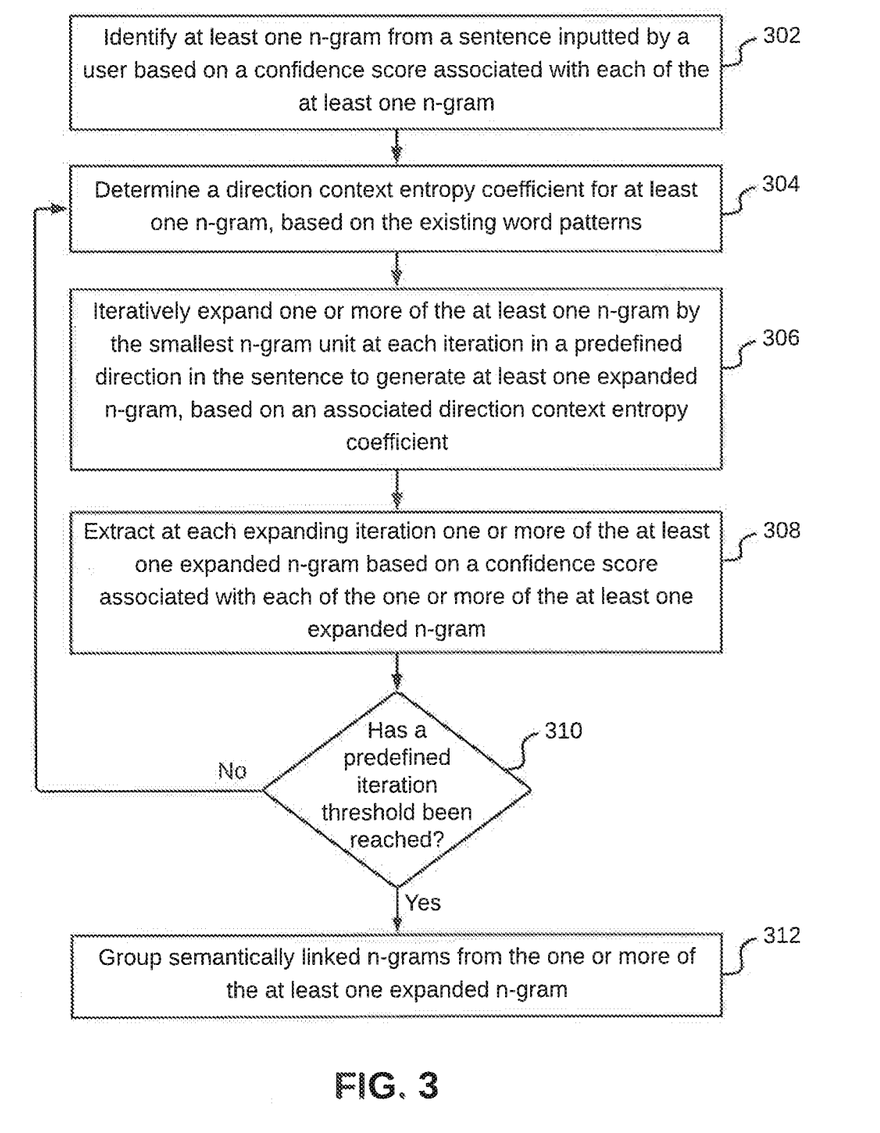
FIG. 3 illustrates a flowchart of a method for identifying and extracting n-grams from sentences, in accordance with an embodiment.

Referring now to FIG. 3, a flowchart of a method for identifying and extracting n-grams from sentences is illustrated, in accordance with an embodiment. As explained in detail in FIG. 1 along with an example, an n-gram may be a contiguous sequence of "n" number of words from a given sequence of text or speech. In an embodiment, n-gram may be a contiguous sequence of syllables, alphabets, or words. An n-gram that includes a single word is a unigram, an n-gram that includes two contiguous words is a bigram, an n-gram that includes three contiguous word is a unigram, and so on and so forth. The sentence may be a natural language sentence inputted by a user either vocally (for example, on an Interactive Voice Response (IVR) menu) or by way of text (for example, on a chat window). The method is a Bootstrapping based method that includes incremental learning of n-grams identification and extraction.

Once a sentence has been inputted by a user, computing device 102, at step 302, identifies one or more n-grams from the sentence. During initiation of the process, each of the one or more n-grams identified from the sentence may be unigrams. By way of an example, the sentence is: "I work with American Express in United States of America." The unigrams identified for this sentence include: "Work," "With," "I," "American," "United," "America," "Express," and "States."

The one or more n-grams may be identified based on a confidence score associated with each of the one or more n-grams. A confidence score for an n-gram is computed based on comparison of the n-gram with existing word patterns. The existing word patterns may be stored in a data repository (not shown in FIG. 1) in communication with computing device 102 via network 106. The existing word patterns may be added in the data repository based on test data extracted from a word corpus that has an exhaustive list of word patterns. The data repository may be continuously updated based on identification of new word patterns.

The confidence score for an n-gram may be computed based on association coefficient computed for degree of association of an n-gram relative to one or more adjacent words when compared with the existing word patterns. In an embodiment, for an identified unigram, the association coefficient is used to estimate whether the identified unigram is tightly coupled with the existing word pattern or not. In other words, based on the association coefficient the probability of the identified unigram occurring alongside other words in the existing word patter is determined. Higher is the association coefficient, higher would be the confidence score for the identified unigram occurring alongside other words. In an exemplary embodiment, the association coefficient may be computed using equation 1 given below:

Association Coefficient for Unigram subtuples = (1)

$$\log\frac{ad}{bc} - 3.29\sqrt{\frac{1}{a}+\frac{1}{b}+\frac{1}{c}+\frac{1}{d}}$$

The confidence score thus uses co-occurrence and marginal frequencies and are expressed as a, b, c, and d. The contingency table for the bigram (x y) is given below as table 1.

TABLE 1

| a = f(xy) | b = f(xy^) | f(x*) |
| c = f(x^y) | d = f(x^y^) | f(x^*) |
| f(*y) | f(*y^) | N |

Where
 f(xy) denotes the frequency of x and y occurring together;
 f(xy^) denotes the frequency of x and not y (i.e., x with some other variables);
 f(x^y) denotes the frequency of y and not x (i.e., y with some other variables); and
 f(x^y^) denotes the frequency of neither y nor x (i.e., x and y, both occurring with some other variables).

If, based on the association coefficient, it is determined that the identified unigram is loosely coupled, then the process does not move ahead for that identified unigram. By way of an example, the association coefficient for the unigram "American" occurring before the word "Express" will be high. However, the association coefficient for the unigram "America" occurring before the word "Express"

will be considerably low. By way of an example for a unigram subtuple, the unigram subtuple scoring may be computed for the bigram "American Express", where the unigrams are "American" and "Express." Similarly, the words in a sentence are validated against the subtuple scoring and a decision is reached whether to consider it as an n-gram or not, based on the association coefficient scoring.

In an embodiment, at step 302, seed patterns may be identified based on the confidence of the unigram instances in the training data or the exiting word patterns. The confidence score for a unigram is computed based on the unigram sub-tuple scoring mechanism given in equation 1 above, where the word associated features and the co-occurrence features are used to compute the association coefficient. These seed examples are then given for matching with the existing word patterns to extract the instances that are precisely matched with one or more patterns in the existing word patterns. The instances that are not exactly matched are then processed for partial matching.

Thereafter, at step 304, based on the existing word patterns, computing device 102 determines a direction context entropy coefficient for each of the one or more n-grams identified at step 302. The direction context entropy coefficient includes a left context entropy coefficient and a right context entropy coefficient. When the left context entropy coefficient for the n-gram is higher than an associated predefined context threshold, the n-gram is expanded in the left direction in the sentence. In continuation of the example above, for the unigram "America," the left context entropy coefficient would be higher than the associated predefined context threshold. Thus, the unigram "America" will be expanded in the left direction in the sentence.

Alternatively, when the right context entropy coefficient for the n-gram is higher than an associated predefined context threshold, the n-gram is expanded in the right direction in the sentence. In continuation of the example above, for the unigram "American," the right context entropy coefficient would be higher than the associated predefined context threshold. Thus, the unigram "American" will be expanded in the right direction in the sentence.

In an exemplary embodiment, a left context entropy coefficient and a right context entropy coefficient for an n-gram may be computed using the equations 2 and 3 respectively given below:

$$\text{Left Context Entropy Coefficient} = -\sum_{w} P(w \mid C_{xy}^l) \log P(w \mid C_{xy}^l) \quad (2)$$

$$\text{Right Context Entropy Coefficient} = -\sum_{w} P(w \mid C_{xy}^r) \log P(w \mid C_{xy}^r) \quad (3)$$

where, table-2 given below, denotes different notations of context measures used in equations 2 and 3 above:

TABLE 2

| | |
|---|---|
| $C_w$ | Empirical context of w |
| $C_{xy}$ | Empirical context of xy |
| $C_{xy}^l$ | Left immediate context of xy |
| $C_{xy}^r$ | Right immediate context of xy |

Based on the associated direction context entropy coefficient, at step 306, computing device 102, at each iteration, iteratively expands one or more n-grams (identified at step 304) by the smallest n-gram unit in a predefined direction (i.e., left direction or right direction) in the sentence to generate one or more expanded n-grams. The smallest n-gram unit is a unigram. In other words, an n-gram is expanded by a unigram at each iteration. Thus, if the left direction context entropy coefficient is greater than the associated predefined context threshold, the n-gram is expanded in the left direction in the sentence. In continuation of the example above, the unigram "America," will be expanded in the left direction in the sentence, thereby generating a bigram "American Express". Similarly, the unigram "American" will be expanded in the right direction in the sentence, thereby generating a bigram "of America."

It will be apparent to a person skilled in the art that the step 306 is carried out iteratively, and a current n-gram is expanded by a unigram (or a single word) in each iteration, such that, if direction context entropy coefficient is computed for a bigram, the expanded n-gram would be a trigram. Similarly, if direction context entropy coefficient is computed for a trigram, the expanded n-gram would be a tetra-gram.

At each expanding iteration, computing device 102, at step 308, extracts one or more expanded n-grams based on a confidence score associated with each of the one or more expanded n-gram. In other words, after an n-gram has been expanded to generate an expanded n-gram, first a confidence score is computed for the expanded n-gram, and based on the confidence score for the expanded n-gram, the expanded n-gram is extracted or ignored. In an embodiment, the expanded n-gram is extracted if confidence score associated with the expanded n-gram is greater than an associated threshold score. Thus, out of all expanded n-grams at step 306, only those expanded n-grams are extracted, which have a confidence score greater than the associated threshold.

A confidence score for an expanded n-gram is computed based on comparison of the expanded n-gram with the existing word patterns. This is similar to the confidence score computed for an n-gram described in step 302 along with the equation 1 given as an exemplary embodiment. Thus, the confidence score for an expanded n-gram may also be computed based on association coefficient computed for degree of association of the expanded n-gram relative to one or more adjacent words when compared with the existing word patterns. In an embodiment, for a bigram generated after expanding a unigram, the association coefficient is used to estimate whether the bigram is tightly coupled with the existing word pattern or not. Higher is the association coefficient, higher would be the confidence score for the expanded n-gram occurring alongside other words. In continuation of the example above, the bigram "American Express" has a high confidence score, as it would match with existing word patterns. As a result, the bigram "American Express" will be extracted. Similarly, the bigram "of America" would also be extracted. In this case, in the subsequent iterations, the trigram "states of America" and the tetra-gram "United States of America" would be extracted.

Thereafter, at step 310, a check is performed to determine whether a predefined iteration threshold has been reached. In an embodiment, the predefined iteration threshold may be set to a number of iterations decided by the administrator. In another embodiment, the predefined iteration threshold is reached when no new patterns and/or n-grams are available or identified. This step is essential as one of the important aspect of n-gram identification is boundary detection, i.e., when to stop n-gram expansion. It is necessary to detect the boundary, because n-gram instances are of variable length and thus new pattern detection can stop at different iterations. This boundary detection is thus helpful in limiting the iterations with respect to the length of the n-grams. If the number of iterations are not limited, there is a possibility of getting overfitting issues, that result in obtaining more abstract level patterns. These abstract level patterns may further lead to the extraction of more false positive instances or n-grams. When the predefined iteration threshold has not been reached, the control goes back to step 304. In other words, an expanded n-gram extracted at step 308 would further be processed at step 304 and a direction context entropy coefficient for the expanded n-grams would be determined. Thereafter, step 306 and 310 would be repeated.

Referring back to step 310, when the predefined iteration threshold has not been reached, computing device 102, at step 312, groups semantically linked n-grams from the one or more expanded n-grams extracted at step 308. Thus, the semantically similar and semantically related instances or n-grams, which are not captured and/or ignored in the previous stages of bootstrapping algorithm are identified and extracted. The semantic similarity between words are captured through knowledge sources, such as, but not limited to semantic ontology and Wordnet. With the use of semantic ontology, the similar words are identified through hierarchical relations between those words. However, in order to avoid the overfilling problem discussed above, the level of super-class and sub-class relationships are restricted to a predefined threshold. Similarly, the Wordnet relations are utilized to identify the synonyms of the words. In such a way, the semantically related and similar n-grams are grouped together.

Figure 4A:
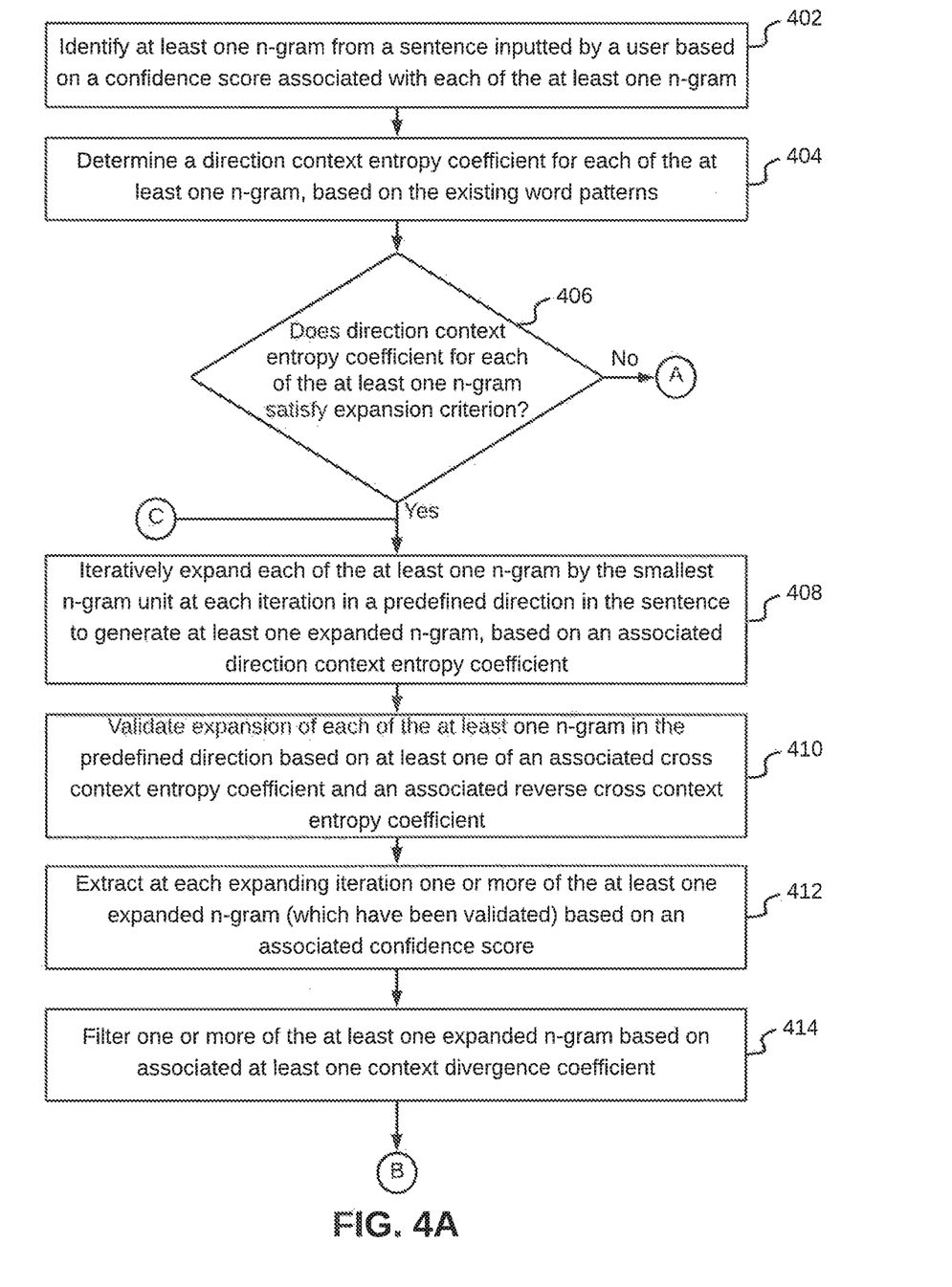
FIGS. 4A and 4B illustrates a flowchart of a method for identifying and extracting n-grams from sentences, in accordance with another embodiment.
Figure 4B:
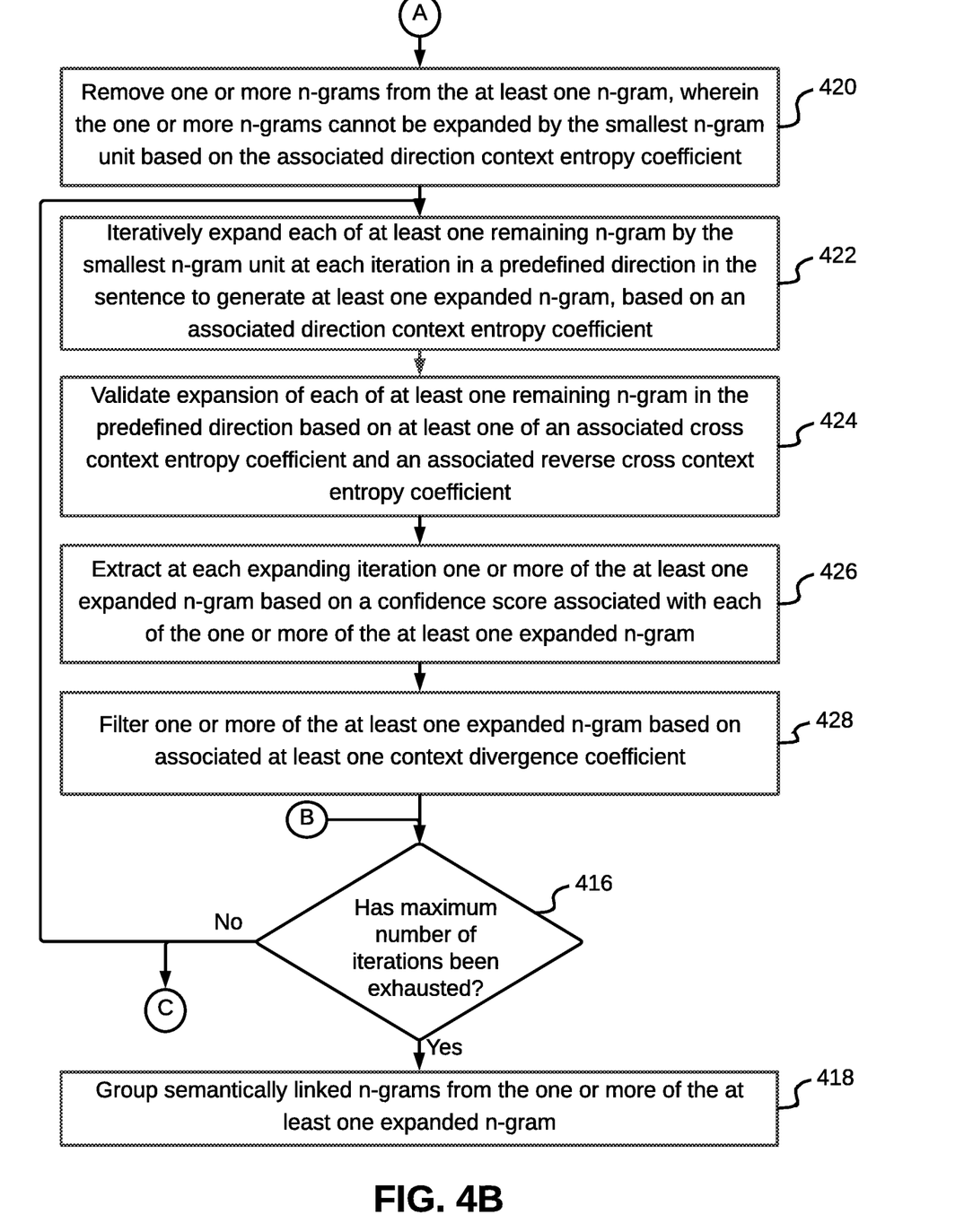

Referring now to FIGS. 4A and 4B, a flowchart of a method for identifying and extracting n-grams from sentences is illustrated, in accordance with another embodiment. Once a sentence has been inputted by a user, computing device 102, at step 402, identifies one or more n-grams from the sentence. The one or more n-grams may be identified based on a confidence score associated with each of the one or more n-grams. A confidence score for an n-gram is computed based on comparison of the n-gram with existing word patterns. The existing word patterns may be stored in a data repository (not shown in FIG. 1) in communication with computing device 102 via network 106. The confidence score for an n-gram may be computed based on association coefficient computed for degree of association of an n-gram relative to one or more adjacent words when compared with the existing word patterns. In an embodiment, for an identified unigram, the association coefficient is used to estimate whether the identified unigram is tightly coupled with the existing word pattern or not. This has been explained in detail in conjunction with FIG. 3.

Thereafter, at step 404, based on the existing word patterns, computing device 102 determines a direction context entropy coefficient for each of the one or more n-grams identified at step 402. The direction context entropy coefficient includes a left context entropy coefficient and a right context entropy coefficient. This has been explained in detail in conjunction with FIG. 3. At step 406, a check is performed to determine whether direction context entropy coefficient for each of the one or more n-grams identified at step 402 satisfy an expansion criterion. The expansion criterion may be a direction context entropy coefficient (either left context entropy coefficient or either right context entropy coefficient left being greater than the associated predefined context threshold.

When direction context entropy coefficient for each of the one or more n-grams identified at step 402 satisfy an expansion criterion, at step 408, at each iteration, the one or more n-grams (identified at step 402) are expanded by the smallest n-gram unit in a predefined direction (i.e., left direction or right direction) in the sentence to generate one or more expanded n-grams, based on the associated direction context entropy coefficient. This has been explained in detail in conjunction with FIG. 3. Thereafter, at step 410, expansion of each of the one or more n-grams in the predefined direction is validated. The validation for an n-gram is performed based on one or more of an associated cross context entropy coefficient and an associated reverse cross context entropy coefficient. These measures will give the confidence to expand each of the one or more n-grams identified at step 402, in order to decide whether to expand an n-gram or to stop expansion of the n-gram. In an exemplary embodiment, equations 4 and 5 may respectively be used to compute cross context entropy coefficient and reverse cross context entropy coefficient for an n-gram:

$$\text{Cross Entropy Coefficient} = -\sum_w P(w|C_x)\log P(w|C_y) \quad (4)$$

$$\text{Reverse Cross Entropy Coefficient} = -\sum_w P(w|C_y)\log P(w|C_x) \quad (5)$$

where, table-3 given below, denotes different notations of context measures used in equations 4 and 5 above:

TABLE 3

| | |
|---|---|
| W | Empirical context of w |
| $C_x$ | Empirical context of x |
| $C_y$ | Empirical context of y |

If one or more expanded n-grams fail to get validated, these expanded n-grams are not processed further. At step 412, at each expanding iteration, one or more expanded n-grams (which have been validated) are extracted based on an associated confidence score. Extraction of expanded n-grams has been explained in detail in conjunction with FIG. 3. At step 414, one or more of the expanded n-grams are filtered based on associated one or more context divergence coefficients. Each of one or more filtered n-grams have low relevancy confidence score, which is determined based on the associated one or more context divergence coefficients. The one or more context divergence coefficients include a left context divergence coefficient and a right context divergence coefficient. The left context divergence coefficient for an n-gram is exact opposite of the left context entropy coefficient for the n-gram. Similarly, the right context divergence coefficient for an n-gram is exact opposite of the right context entropy coefficient for the n-gram. The one or more context divergence coefficients further include a skew divergence coefficient and a reverse skew divergence coefficient, that validate the result obtained from the left and right context divergence coefficients. In an exemplary embodiment, one or more context divergence coefficients are represented using equations 6, 7, 8, and 9 given below:

$$\text{Left Context Divergence Coefficient} = \quad 6$$
$$P(x^*)\log P(x^*) - \sum_w P(w|C_{xy}^l)\log P(w|C_{xy}^l)$$

$$\text{Right Context Divergence Coefficient} = \quad 7$$
$$P(^*y) - \log P(^*y)\sum_w P(w|C_{xy}^r)\log P(w|C_{xy}^r)$$

-continued $$\text{Skew Divergence Coefficient} = D\left(p(w \mid C_x) \| \frac{1}{2}p(w \mid C_y) + \frac{1}{2}p(w \mid C_x)\right) \quad 8$$

Reverse Skew Divergence Coefficient =

$$D\left(p(w \mid C_y) \| \frac{1}{2}p(w \mid C_x) + \frac{1}{2}p(w \mid C_y)\right) \quad 9$$

where, table 4 given below, denotes different notations of context measures used in equations 6, 7, 8, and 9 given above:

TABLE 4

| | |
|---|---|
| $C_w$ | Empirical context of w |
| $C_{xy}$ | Empirical context of xy |
| $C^l_{xy}$ | Left immediate context of xy |
| $C^r_{xy}$ | Right immediate context of xy |

Filtering n-grams with low confidence in the corpus based on one or more context divergence coefficients results in obtaining maximum meaningful n-grams. Additionally, based on divergence of the n-grams, the semantically related and similar items are also identified. Thereafter, at step 416, a check is performed to determine if maximum number of iterations have been exhausted. This has been explained in conjunction with step 310 of FIG. 3. When maximum number of iterations have not been reached, the control goes back to step 408. However, when maximum number of iterations have been reached, at step 418, semantically linked n-grams from the one or more expanded n-grams obtained after filtering are grouped. This has been explained in detail in conjunction with FIG. 3.

Referring back to step 406, when direction context entropy coefficient for each of the one or more n-grams (identified at step 402) does not satisfy expansion criterion, at step 420, one or more n-grams from the one or more n-grams (identified at step 402) are removed. The one or more n-grams that are removed cannot be expanded by the smallest n-gram unit based on the associated direction context entropy coefficient. Thereafter, steps 422 to 428 are executed for the remaining one or more n-grams after removal of one or more n-grams not satisfying the expansion criterion. After step 428, the control goes to step 416, where a check is performed to determine if maximum number of iterations have been exhausted. This has been explained in conjunction with step 310 of FIG. 3. When maximum number of iterations have not been reached, the control goes back to step 422. However, when maximum number of iterations have been reached, at step 418, semantically linked n-grams from the one or more expanded n-grams obtained after filtering are grouped. This has been explained in detail in conjunction with FIG. 3.

Figure 5:
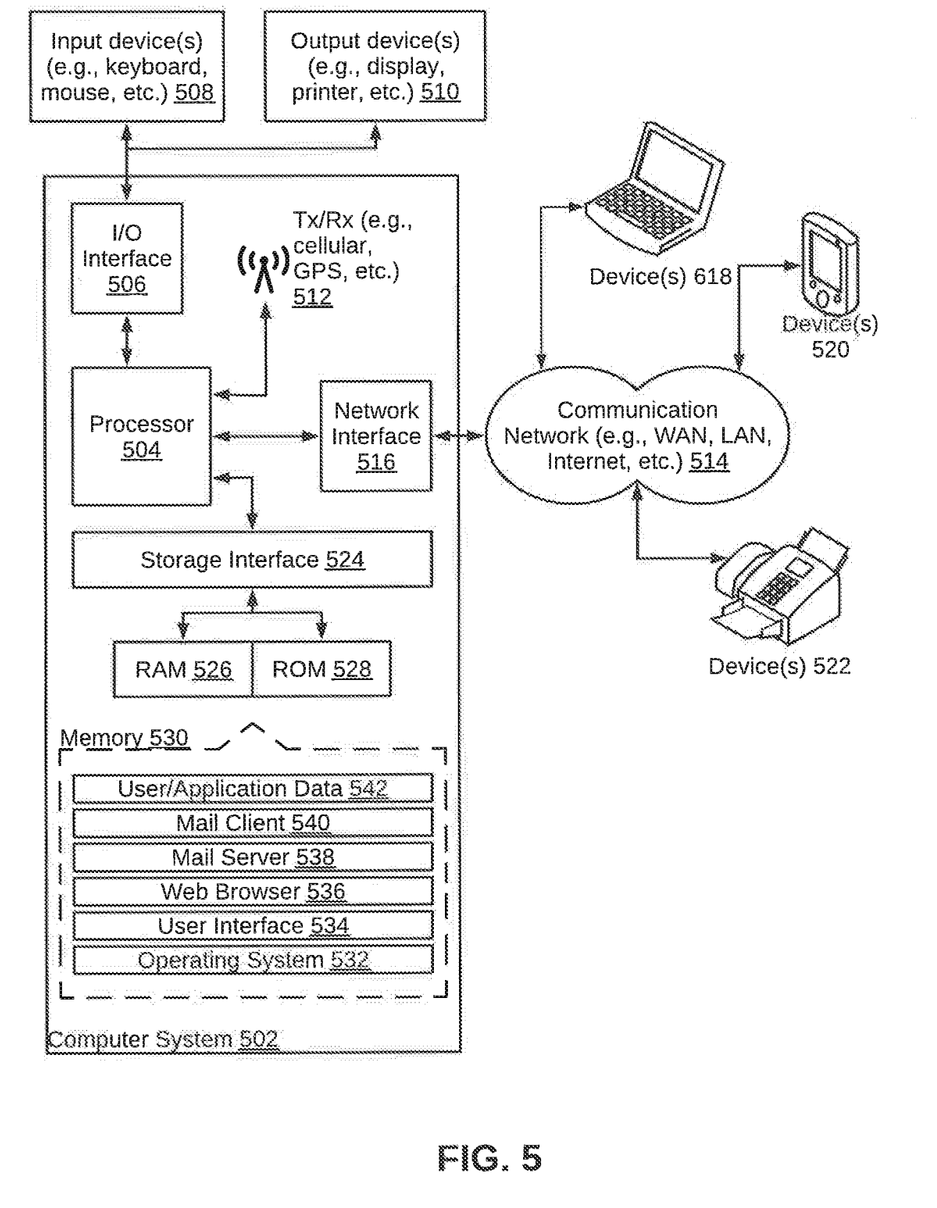
FIG. 5 illustrates a block diagram of an exemplary computer system for implementing various embodiments.

FIG. 5 is a block diagram of an exemplary computer system for implementing various embodiments. Computer system 502 may include a central processing unit ("CPU" or "processor") 504. Processor 504 may include at least one data processor for executing program components for executing user- or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RE antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (e.g., twisted pair 50/500/5000 Base T), transmission control protocol/Internet protocol (TCP/IP), token ring, IEEE 802.11a/b/g/n/x, etc. Communication network 514 may include, without limitation, a direct interconnection, local area network (LAN), wide area network (WAN), wireless network (e.g., using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of these devices.

In some embodiments, processor 504 may be disposed in communication with one or more memory devices (e.g., RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (e.g., any data variables or data records discussed in this disclosure), etc. Operating system 532 may facilitate resource management and operation of computer system 502. Examples of operating systems 532 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for n-gram identification and extraction. The method identifies and extract n-grams from text. In order to achieve this, a bootstrapping based semi-supervised learning algorithm is used, which takes a set of seed patterns as input and extract all the possible matched instances, both exact and partial. The use of association, context, and divergence measures are computed at different stages of the bootstrapping algorithm so as to obtain the confidence of the n-grams and validate its confidence. The method is useful in natural language processing applications, such as, machine Translation, sequence identification and extraction. The method is additionally useful in identifying phrasal terms and complex phrases of different languages and in sequence to sequence matching while converting or translating from one language to the other.

The specification has described method and device for method and device for n-gram identification and extraction. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for n-gram identification and extraction, the method comprising:
    identifying, by a computing device, at least one n-gram from a sentence inputted by a user based on a confidence score associated with each of the at least one n-gram, wherein a confidence score for an n-gram is computed based on comparison of the n-gram with existing word patterns;
    determining, by the computing device, a direction context entropy coefficient for each of the at least one n-gram, based on the existing word patterns;
    iteratively expanding, by the computing device, one or more of the at least one n-gram by the smallest n-gram unit at each iteration in a predefined direction in the sentence to generate at least one expanded n-gram, based on an associated direction context entropy coefficient, wherein the one or more of the at least one n-gram is iteratively expanded until obtaining maximum meaningful n-grams in the predefined direction;
    validating, by the computing device, expansion of the n-gram in the predefined direction based on a cross context entropy coefficient and a reverse cross context entropy coefficient;
    extracting at each expanding iteration, by the computing device, one or more of the at least one expanded n-gram based on a confidence score associated with each of the one or more of the at least one expanded n-gram, wherein a confidence score for an expanded n-gram is computed based on comparison of the expanded n-gram with the existing word patterns; and
    grouping, by the computing device, semantically linked n-grams from the one or more of the at least one expanded n-gram.

2. The method of claim 1, further comprising removing one or more n-grams from the at least one n-gram, wherein the one or more n-grams cannot be expanded by the smallest n-gram unit based on the associated direction context entropy coefficient.

3. The method of claim 1, wherein the predefined direction comprises one of left direction and right direction in the sentence with respect to an n-gram from the at least one n-gram.

4. The method of claim 1, wherein the smallest n-gram unit is a unigram, and wherein the n-gram is expanded by the unigram in the predefined direction in each iteration to generate an (n+1)-gram.

5. The method of claim 1, wherein the confidence score for the n-gram is computed based on an association coefficient computed for degree of association of the n-gram relative to at least one adjacent word when compared with the existing word patterns.

6. The method of claim 1, wherein the direction context entropy coefficient for the n-gram comprises at least one of a left context entropy coefficient and a right context entropy coefficient,
    wherein the n-gram is expanded in the left direction in the sentence, when the left context entropy coefficient for the n-gram is higher than an associated predefined context threshold, and
    wherein the n-gram is expanded in the right direction in the sentence, when the right context entropy coefficient for the n-gram is higher than the associated predefined context threshold.

7. The method of claim 1, further comprising filtering one or more of the at least one n-gram and one or more of the at least one expanded n-gram based on associated at least one context divergence coefficient.

8. The method of claim 7, wherein each of one or more filtered n-grams comprise low relevancy confidence score determined based on the associated at least one context divergence coefficient.

9. The method of claim 1, further comprising limiting the number of expanding iterations based on a predefined iteration threshold.

10. A computing device for n-gram identification and extraction, the computing device comprises:
    a processor; and
    a memory communicatively coupled to the processor, wherein the memory stores processor instructions, which, on execution, causes the processor to:
        identify at least one n-gram from a sentence inputted by a user based on a confidence score associated with each of the at least one n-gram, wherein a confidence score for an n-gram is computed based on comparison of the n-gram with existing word patterns;
        determine a direction context entropy coefficient for each of the at least one n-gram, based on the existing word patterns;
        iteratively expand one or more of the at least one n-gram by the smallest n-gram unit at each iteration in a predefined direction in the sentence to generate at least one expanded n-gram, based on an associated direction context entropy coefficient, wherein the one or more of the at least one n-gram is iteratively expanded until obtaining maximum meaningful n-grams in the predefined direction;
        validate, by the computing device, expansion of the n-gram in the predefined direction based on a cross context entropy coefficient and a reverse cross context entropy coefficient;
        extract at each expanding iteration one or more of the at least one expanded n-gram based on a confidence score associated with each of the one or more of the at least one expanded n-gram, wherein a confidence score for an expanded n-gram is computed based on comparison of the expanded n-gram with the existing word patterns; and group semantically linked n-grams from the one or more of the at least one expanded n-gram.

11. The computing device of claim 10, wherein the processor instructions further cause the processor to remove one or more n-grams from the at least one n-gram, wherein the one or more n-grams cannot be expanded by the smallest n-gram unit based on the associated direction context entropy coefficient.

12. The computing device of claim 10, wherein the predefined direction comprises one of left direction and right direction in the sentence with respect to an n-gram from the at least one n-gram.

13. The computing device of claim 10, wherein the confidence score for the n-gram is computed based on an association coefficient computed for degree of association of the n-gram relative to at least one adjacent word when compared with the existing word patterns.

14. The computing device of claim 1, wherein the direction context entropy coefficient for the n-gram comprises at least one of a left context entropy coefficient and a right context entropy coefficient, wherein the n-gram is expanded in the left direction in the sentence, when the left context entropy coefficient for the n-gram is higher than an associated predefined context threshold, and wherein the n-gram is expanded in the right direction in the sentence, when the right context entropy coefficient for the n-gram is higher than the associated predefined context threshold.

15. The computing device of claim 10, wherein the processor instructions further cause the processor to filter one or more of the at least one n-gram and one or more of the at least one expanded n-gram based on associated at least one context divergence coefficient.

16. The computing device of claim 15, wherein each of one or more filtered n-grams comprise low relevancy confidence score determined based on the associated at least one context divergence coefficient.

17. The computing device of claim 10, wherein the processor instructions further cause the processor to limit the number of expanding iterations based on a predefined iteration threshold.

18. A non-transitory computer-readable storage medium having stored thereon, a set of computer-executable instructions causing a computer comprising one or more processors to perform steps comprising:

identifying at least one n-gram from a sentence inputted by a user based on a confidence score associated with each of the at least one n-gram, wherein a confidence score for an n-gram is computed based on comparison of the n-gram with existing word patterns;

determining a direction context entropy coefficient for each of the at least one n-gram, based on the existing word patterns;

iteratively expanding one or more of the at least one n-gram by the smallest n-gram unit at each iteration in a predefined direction in the sentence to generate at least one expanded n-gram, based on an associated direction context entropy coefficient, wherein the one or more of the at least one n-gram is iteratively expanded until obtaining maximum meaningful n-grams in the predefined direction;

validating, by the computing device, expansion of the n-gram in the predefined direction based on a cross context entropy coefficient and a reverse cross context entropy coefficient;

extracting at each expanding iteration one or more of the at least one expanded n-gram based on a confidence score associated with each of the one or more of the at least one expanded n-gram, wherein a confidence score for an expanded n-gram is computed based on comparison of the expanded n-gram with the existing word patterns; and grouping semantically linked n-grams from the one or more of the at least one expanded n-gram.

* * * * *